United States Patent [19]
Rodriguez

[11] 3,804,535
[45] Apr. 16, 1974

[54] DUAL WAVELENGTH PHOTOMETER RESPONSE CIRCUIT
[75] Inventor: Rodolfo R. Rodriguez, Silver Spring, Md.
[73] Assignee: Baxter Laboratories, Inc., Morton Grove, Ill.
[22] Filed: Oct. 13, 1972
[21] Appl. No.: 297,279

[52] U.S. Cl. .................... 356/217, 356/41, 356/205
[51] Int. Cl. .......................................... G01n 33/16
[58] Field of Search ......... 356/246, 201, 39, 40, 41, 356/229, 217, 205

[56] References Cited
UNITED STATES PATENTS
3,634,868  1/1972  Pelavin et al. .................. 356/39
3,241,432  3/1966  Skeggs et al. .................. 356/179
3,544,225  12/1970  Wattenburg et al. ............ 356/201
3,703,336  11/1972  Rosse et al. .................... 356/246

Primary Examiner—Ronald L. Wibert
Assistant Examiner—S. K. Morrison
Attorney, Agent, or Firm—Herman L. Gordon

[57] ABSTRACT

An apparatus to measure the difference in intensity between periodically recurring reference and measure light pulses of different wavelength reaching a photomultiplier tube, the apparatus having alternately keyed steady voltage-generating circuits keyed in synchronism with the light pulses and generating concurrent steady d.c. electrical signals with amplitudes corresponding to the light pulse intensities which are furnished to the respective inputs of a differential amplifier. The output of the differential amplifier is therefore a steady signal representing the difference in intensity between the reference and measure light pulses.

6 Claims, 2 Drawing Figures

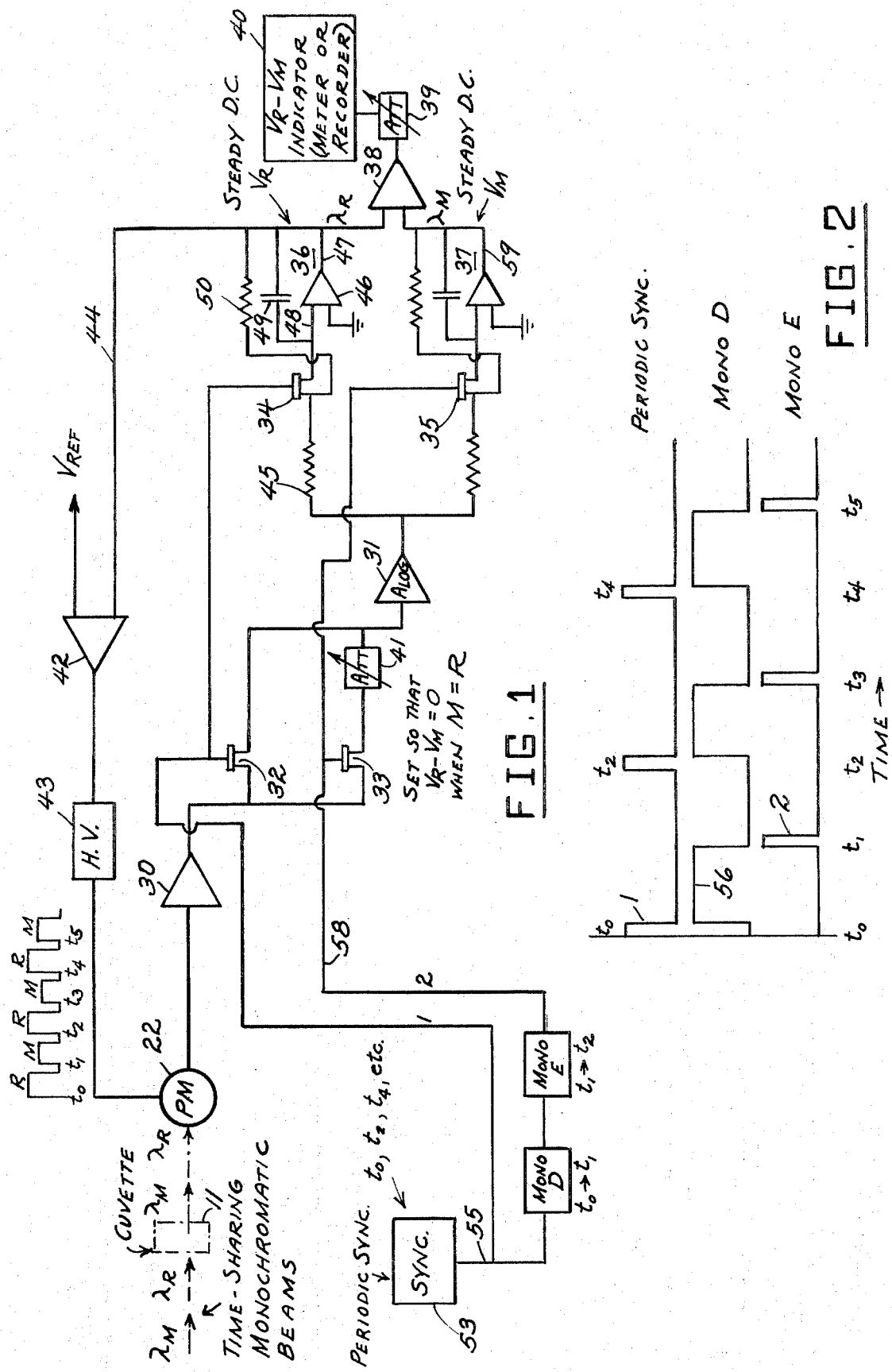

DUAL WAVELENGTH PHOTOMETER RESPONSE CIRCUIT

This invention relates to photometer response circuits, and more particularly to a response circuit for a photometer of the dual wavelength type.

A main object of the invention is to provide a novel and improved apparatus for a dual wavelength photometer for measuring the difference in intensity between the reference and measure light beams reaching the photosensitive element of the photometer, the apparatus being relatively simple in construction, employing inexpensive components, and providing clear and reliable continuous indications of the differences of intensity of the reference and measure light beams as said light beams pass through a sample container during an experiment or test.

A further object of the invention is to provide an improved dual wavelength photometer response circuit which is economical in design, which is stable in operation, and which can be easily balanced and calibrated.

A still further object of the invention is to provide an improved time-sharing computing circuit for a dual wavelength photometer, the circuit being arranged to generate concurrent steady d.c. voltages representing the respective intensities of the time-sharing exit reference and measure beams emerging from a sample under test, the circuit including means to continuously compute and indicate the difference in amplitude of said steady d.c. voltages and to thereby provide a continuous showing of the difference in intensity between the time-sharing reference and measure beams.

Further objects and advantages of the invention will become apparent from the following description and claims, and from the accompanying drawings, wherein:

FIG. 1 is a schematic block diagram of an improved dual wavelength photometer computing and indicating response circuit constructed in accordance with the present invention.

FIG. 2 is a diagram showing the wave forms of triggering and synchronization pulses derived from the synchronization and timing portion of the circuit of FIG. 1.

Referring to the drawings, 22 designates the photomultiplier tube of a dual wavelength photometer apparatus, for example, of the type described in the patent application of George W. Lowy et al; Ser. No. 291,046, filed Sept. 21, 1972, entitled "Dual Wavelength Photometer for Absorbance Difference Measurements." In such a photometer apparatus, time-sharing monochromatic beams comprising a reference beam of one wavelength $\lambda_R$ and a measure beam of another nearby wavelength $\lambda_M$ are sequentially directed through a sample cuvette 11 at a predetermined recurring rate and the emerging resultant beams impinge on the photomultiplier tube 22. The sample cuvette 11 may contain a material such as blood, or the like, undergoing a titration, such as a treatment by an oxygenating reagent, wherein the difference in absorbance of the material of the two wavelengths $\lambda_R$ and $\lambda_M$ changes as the treatment continues.

The two wavelengths $\lambda_R$ and $\lambda_M$ are relatively close together so that wavelength-dependent light-scattering effects are, for all practical purposes, identical at the two wavelengths. These two wavelengths may be derived from a differential spectrum of two chemical states of the material under test, one ($\lambda_R$) being a wavelength at which there is substantially no difference in absorbance as between treated and untreated sample material (for example, as between deoxygenated and oxygenated blood) and the other ($\lambda_M$) being a nearby wavelength at which there is a maximum difference in absorbance as between treated and untreated material. In the case described in the above indentified previously filed patent application $\lambda_R$ is 448 nm and $\lambda_M$ is 439 nm. In this typical example, and "oxygen dissociation curve" showing the progressive oxygenation characteristic of a blood sample is derived.

Various means to physically generate the wavelengths $\lambda_R$ and $\lambda_M$ may be utilized, such as a rotary time-sharing filter disc, as described in the above-identified previously filed patent application Ser. No. 291,046, or any other suitable time-sharing duochromator device providing a constant phase spacing between the reference and measure beams.

The resultant signals from the photomultiplier tube 22 are delivered through an amplifier 30 to a logarithmic amplifier 31 through appropriately triggered electronic switch devices 32 and 33 so as to arrive at the input of amplifier 31 substantially in synchronism with the aforesaid reference and measure beams. The resultant logarithmic output signals from amplifier 31 are delivered through respective similarly triggered electronic switch devices 34 and 35 to respective "track and hold" integrating circuits 36 and 37 which generate corresponding steady d.c. output voltages representing the logarithmic output pulse signals, which are supplied simultaneously to the two imputs of a differential amplifier 38. The output of amplifier 38, which substantially comprises the difference between the steady d.c. input signals from circuits 36 and 37, is delivered through a variable calibrating attenuator device 39 to a suitable indicator 40, such as a meter or recorder.

The triggered circuit branch containing the electronic switch device for closing the switch device synchronously with the exposure of the cuvette 11 to the $\lambda_M$ measure beam also contains a variable attenuator device 41 for suitably balancing the signals furnished to amplifier 31 at the beginning of a test.

In order to substantially compensate for the nonlinearity of the response characteristic of the photomultiplier tube 22, the dynode voltage thereof is regulated in accordance with the steady d.c. voltage derived at the output of the integrating circuit 36. Thus, the output voltage of circuit 36 is compared with a reference voltage in a differential amplifier 42, and the output signal of amplifier 42 is utilized in a conventional manner to adjust the voltage output value of a high voltage power supply device 43 furnishing the photomultiplier dynode voltage. This comparison is obtained by connecting the output of circuit 36 through a conductor 44 to one of the imput terminals of the differential amplifier 42, as shown in FIG. 1.

The operation of the "track and hold" integrating circuit 36 is as follows: a pulse from the output of logarithmic amplifier 31 passes through a resistor 45 and field effect transistor 34 to an input terminal 48 of an amplifier 46 and the amplified pulse appears at the output terminal 47 of amplifier 46. A capacitor 49 connected between input terminal 48 and output terminal 47 is charged to a d.c. voltage corresponding to the amplitude of the input-output voltage drop. A discharge resistor 50 is connected across capacitor 49 through field effect transistor 34 to allow the capacitor to adjust its charge with changing amplitudes of input pulses, the triggering of the field effect transistor 34 being synchronized with the input pulses. Thus, a steady d.c. voltage appears at output terminal 47 which is in accordance with the amplitude of the input pulse applied at terminal 48, this steady d.c. voltage being maintained until the next triggering of the field effect transistor 34, at which time its value may be changed because of a different amplitude of the next input pulse. The "track and hold" integrating circuit 37 operates in the same manner.

A suitable pulse keying device 53 is provided, for example, a pulse generator 53, synchronized in any suitable manner with the associated time-sharing duochromator, for example, in the manner described in the above-identified previously filed application Ser. No. 291,046. The synchronized pulse generator 53 derives a pulse 1 which is synchronized with $\lambda_R$ and is delivered to a conductor 55 leading to the input of a chain of monostable oscillators D,E. Pulse 1 generates a rectangular pulse 56 in monostable oscillator D of a duration such as to generate a narrow pulse 2 in monostable oscillator E at precisely the time that the measure wavelength $\lambda_M$ is applied to the cuvette 11.

Thus, the first narrow pulse 1 is generated at $t_0$ and the second narrow pulse 2 is generated at $t_1$, synchronized with the $\lambda_M$ beam in FIG. 1. This cycle is repeated at $t_2$, $t_3$, $t_4$, $t_5$, etc., in phase with the recurring time-sharing $\lambda_R$ and $\lambda_M$ beams passing through cuvette 11. Therefore, corresponding signals R and M, shown in FIG. 1, are generated by the photomultiplier tube 22 whose amplitudes are in accordance with the intensities of the beams impinging on the tube.

Therefore, it will be seen that the pulses 1 and 2 are spaced apart by time intervals corresponding to the time spacing of the recurring $\lambda_R$ and $\lambda_M$ beams.

The conductor 55 carrying pulse 1 is connected to the trigger electrodes of the field effect transistors 32 and 34 so that these transistors are rendered conductive simultaneously with the presence of the reference wavelength $\lambda_R$ in the optical path containing cuvette 11. This connects the output of the amplifier 30 to the imput of the logarithmic amplifier 31 and simultaneously connects the output of amplifier 31 to the "track and hold" circuit 36, providing the above-mentioned steady d.c. voltage at terminal 47, connected to one of the input terminals of differential amplifier 38.

A conductor 58 carrying pulse 2 is connected to the trigger electrodes of the field effect transistors 33 and 35 so that these transistors are in turn rendered conductive simultaneously with the presence of the measure wavelength $\lambda_M$ in the optical path containing cuvette 11. This correspondingly connects the output of amplifier 30 to the input of logarithmic amplifier 31 and simultaneously connects the output of amplifier 31 to the "track and hold" circuit 37, providing the steady d.c. voltage at the output terminal 59 corresponding to the response of the photomultiplier tube 22 to the measure wavelength, and which is supplied to the other input terminal of differential amplifier 38.

It will be seen that the device above described acts as a continuous demodulator to provide a steady d.c. voltage corresponding to the absorbance difference between the $\lambda_R$ reference beam and the $\lambda_M$ measure beam as the beams pass sequentially through the sample cuvette 11.

Overall calibration may be provided by means of variable attenuator device 39 employed in conjunction with a standard optical density filter, or the like, of known absorbance positioned between the source of the $\lambda_R$ reference beam and the cuvette 11, with the cuvette empty.

While a specific embodiment of an improved demodulating dual wavelength photometer response circuit has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a photometer, a source of time-shared sequential light reference and measure beams recurring cyclically at a predetermined fixed rate, cuvette means included in the path of said beams, a photosensitive device located to receive said beams and generating respective time-shared sequential electrical pulse signals in accordance with the intensities and durations of said beams after they have passed through the cuvette means, means to generate respective substantially concurrent steady electrical signals having amplitudes in accordance with said response signals, and means to measure the difference in the amplitudes of said steady signals, wherein the means to generate the respective steady signals and to measure the difference in their amplitudes comprises a differential amplifier, respective steady signal-generating devices connected to the inputs of said differential amplifier, respective alternately keyed circuit means drivingly connecting the photosensitive device to said steady signal-generating devices, means to key said keyed circuit means at said predetermined rate, and indicating means connected to the output of said differential amplifier, and wherein each of the steady signal-generating devices comprises an amplifier, the associated keyed circut means including an electronic switch connected in series with the input of said last-named amplifier, and a parallel-connected resistor and capacitor connected in parallel through said electronic switch, the capacitor being connected directly across the input and output terminals of the last-named amplifier, and means closing said electronic switch at said predetermined rate so that the resistor forms a discharge circuit for the capacitor when the electronic switch is closed, whereby to allow the capacitor to adjust its charge with changing amplitudes of input pulses and to thereby control the voltage level at the output of the last-named amplifier.

2. The apparatus of claim 1, and respective additional keyed circuit branches for said reference and measure beams connected between said photosensitive device and said first-named keyed circuit means, one of said additional circuit branches including adjustable attenuator means for balancing the signals furnished to said steady signal-generating devices at the beginning of a test, and means to key said respective additional keyed circuit branches synchronously with said respective first-named keyed circuit means.

3. The apparatus of claim 1, and wherein said keying means comprises a periodic synch generator operating at the same rate as said reference light beam, circuit means operatively connecting said synch generator to one of said keyed circuit means, and means to operate the other keyed circuit means after a time delay corresponding to the time spacing between the reference and measure light beams.

4. The apparatus of claim 3, and wherein the means to operate the other keyed circuit means comprises a timed signal generating circuit connected to the output of said synch generator having means to generate an output signal at a time delay after excitation thereof corresponding to the time spacing between the reference and measure light beams, and circuit means operatively connecting the output of said timed signal generating circuit to said other keyed circuit means.

5. The apparatus of claim 4, and a logarithmic amplifier connected between said photosensitive device and said steady signal generating devices.

6. The apparatus of claim 5, and respective additional keyed circuit branches for said reference and measure beams connected between said photosensitive device and said logarithmic amplifier, one of said additional circuit branches including adjustable attenuator means for balancing the signals furnished to the logarithmic amplifier at the beginning of a test, and means to key said additional circuit branches synchronously with said respective steady signal-generating devices.

* * * * *